United States Patent [19]

Shimada

[11] Patent Number: 4,899,380
[45] Date of Patent: Feb. 6, 1990

[54] LOUDSPEAKING TELEPHONE WITH A VARIABLE GAIN CIRCUIT

[75] Inventor: Keiko Shimada, Tokyo, Japan

[73] Assignee: NEC Corporation, Japan

[21] Appl. No.: 215,052

[22] Filed: Jul. 5, 1988

[30] Foreign Application Priority Data

Jul. 6, 1987 [JP] Japan .................................. 62-169272

[51] Int. Cl.⁴ .......................... H04M 1/60; H04M 9/08
[52] U.S. Cl. ...................................... 379/389; 379/390
[58] Field of Search ............... 379/389, 390, 388, 395, 379/406, 409

[56] References Cited

U.S. PATENT DOCUMENTS 3,725,585 4/1973 Moniak ................................ 379/390
4,025,728 5/1977 Jacobson ............................. 379/390
4,629,829 12/1986 Puhl et al. ....................... 379/390 X

OTHER PUBLICATIONS

A. Busala, "Fundamental Consideration in the Design of a Voice—Switched Speakerphone," The Bell System Technical Journal, vol. XXXIX, 3-1960, pp. 265-294.
W. F. Clemency et al., "Functional Design of a Voice—Switched Speakerphone", The Bell System Technical Journal, vol. XL, May 1961, pp. 649-668.

Primary Examiner—James L. Dwyer
Attorney, Agent, or Firm—Laff, Whitesel, Conte & Saret

[57] ABSTRACT

A loudspeaking telephone has a circuit which is much less likely to go into singing or howling during the change over time while it is switching between transmit and receive modes. This is done by using FETs as variable resistors during the change over period. As a result of the resistance variation during change over, the total gain of both the transmit and receive channels added together does not exceed the gain during either the transmit or the receive modes.

12 Claims, 3 Drawing Sheets

LOUDSPEAKING TELEPHONE WITH A VARIABLE GAIN CIRCUIT

BACKGROUND OF THE INVENTION

The present invention relates to a loudspeaking telephone utilizing a microphone and a loudspeaker, and more particularly, to a loudspeaking telephone with a variable gain circuit for controlling the gains in the receiving and transmitting paths.

In the prior art speakerphones, the gains in the receiving and transmitting paths are switched by means of a variable resistance element, such as a field effect transistor (FET), in response to the values of the receiving and transmitting signal levels. In order to avoid singing or howling, it is preferable for the product of the gains in the receiving and transmitting paths, called as the "total gain", to always be constant.

In the prior art loudspeaking telephones, however, the total gain is not necessarily constant due to the variations of the gate voltage versus conducting resistance characteristics of the FET which determines the gains in the receiving and transmitting paths. Namely, under "a stable period" during which the gains in the receiving and transmitting paths are stable, the total gain is constant. On the contrary, under "a changeover period" during which the gains in the receiving and transmitting paths are switched, the total gain may increase due to the forementioned variations of the characteristics. As a result, the howling or singing problem may occur.

The prior art loudspeaking telephones is described in the following papers:

(1) A. Busala, "Fundamental Consideration in the Design of a Voice-Switched Speakerphone, "THE BELL SYSTEM TECHNICAL JOURNAL, Vo. XXXIX, March 1960, pp. 265-294; and (2) W. F. Clemency et al, "Functional Design of a Voice-Switched Speakerphone, "THE BELL SYSTEM TECHNICAL JOURNAL, Vo. XL, May 1961, pp. 649-668.

(3) U.S. Pat. No. 4,629,829 issued to Puhl et al, Dec. 16, 1986.

SUMMARY OF THE INVENTION

An object of the present invention is to provide a loudspeaking telephone for suppressing the increase of the total gain during the changeover period of the gain so as to prevent the singing or howling.

According to the present invention, a loudspeaking telephone with a variable gain circuit comprises: a receiving path including first amplifying means for amplifying a receiving signal by a first gain to provide a receiving speech signal, a transmitting path including second amplifying means for amplifying a transmitting speech signal by a second gain to provide a transmitting signal, first means for comparing a signal level on the receiving path with a signal level on the transmitting path to provide a control signal to control the first and the second gains and second means responsive to the control signal for switching between the first and second gains to make one of the gains larger than the other of the gains, wherein the total gain obtained from the first and second gains during the changeover period of the gains is either equal to or smaller than the total gain during the stable period excluding the changeover period.

BRIEF DESCRIPTION OF THE DRAWINGS

The present invention will be described in further detail below with reference to the accompanying drawings in which.

DETAILED DESCRIPTION OF THE PREFERRED EMBODIMENTS

Figure 1:
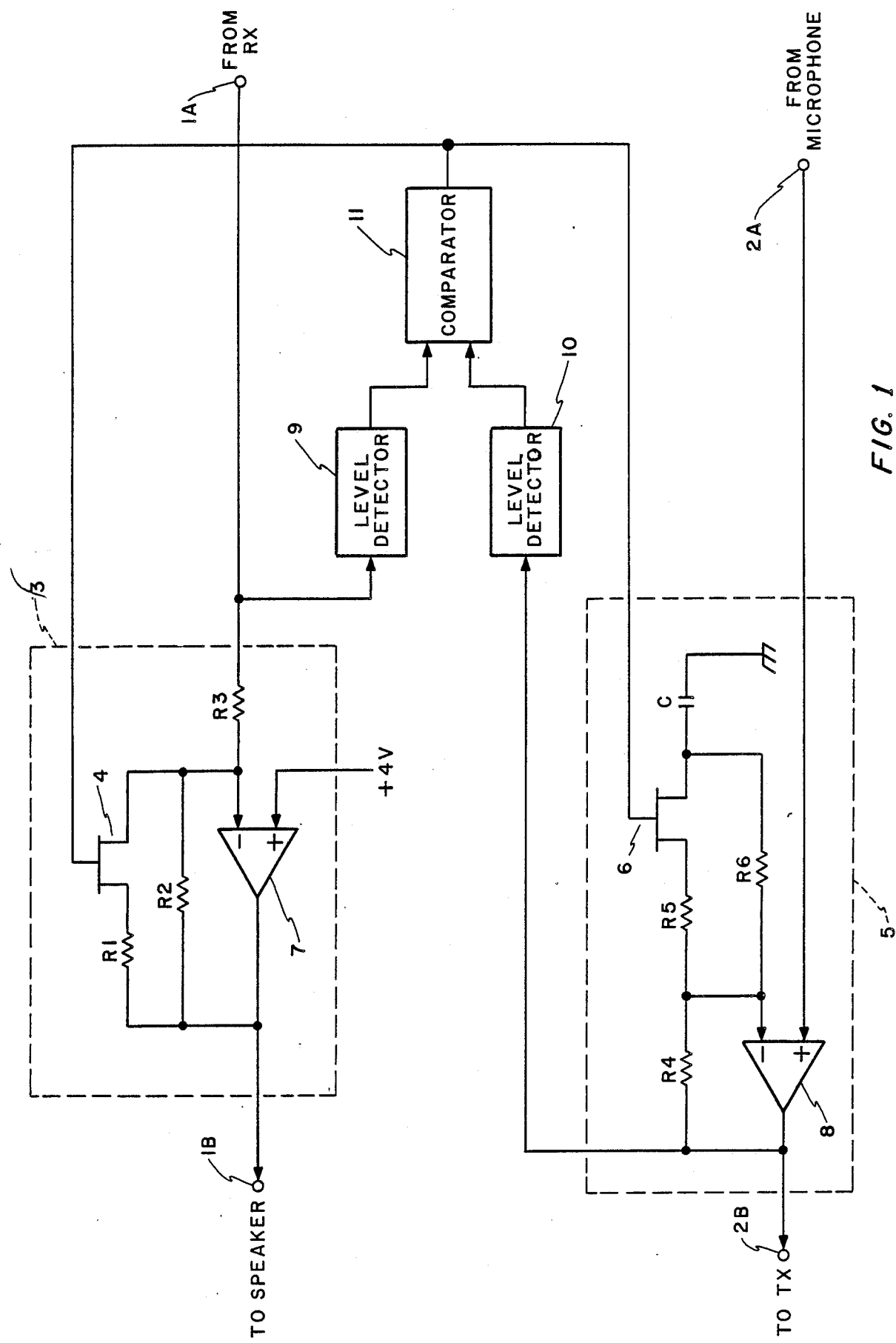
FIG. 1 is a schematic diagram showing a first embodiment of the loudspeaking telephone according to the present invention.

In FIG. 1, the paths from terminal 1A to 1B and from terminal 2A to 2B are the receiving and the transmitting paths, respectively. When this embodiment is applied to the mobile telephone, the terminals 1A and 1B are connected to a receiver (RX) and a loudspeaker, respectively, while the terminals 2A and 2B are connected to a microphone and a transmitter (TX), respectively.

A receiving variable gain amplifier circuit 3 comprises an operational amplifier 7 acting as an inverting amplifier. The circuit 3 amplifies a receive signal from terminal 1A to produce an amplified signal and supply it to the terminal 1B as a receive speech signal. A serial connection of an FET 4 and a resistor $R_1$ is connected in parallel with a feedback resistor $R_2$ of the amplifier 7.

A transmitting variable gain amplifier circuit 5 comprises an operational amplifier 8 acting as a non-inverting amplifier. The circuit 5 amplifies a transmit speech signal from microphone 2A to produce an amplified signal and supply it to the terminal 2B as a transmit signal. A serial connection of an FET 6 and a resistor $R_5$ is connected in parallel with an inverting input resistor $R_6$ of the amplifier 8. The connection point of the FET 6 and the resistor $R_6$ is connected to the ground through a capacitor C.

The receive signal level is detected by a receiving level detector 9, while the transmit signal level is detected by a transmitting level detector 10. The detected results of detectors 9 and 10 are compared with each other by a comparator 11. In response to the comparison result, the comparator 11 supplies the gates of the FETs 4 and 6 with a control voltage, by which both FETs 4 and 6 are switched off if the output level of the receiving level detector 9 is higher than the output level of the transmitting level detector 10. Otherwise, they are switched on.

When the FETs 4 and 6 are off, their resistance values are substantially infinite. In this case, the feedback resistor of the operational amplifier 7 is only $R_2$, causing the gain of the amplifier 7 to become maximum. Also, since the inverting input resistor of the amplifier 8 is only $R_6$, the gain of the amplifier 8 becomes minimum.

On the other hand, when both FETs 4 and 6 are on, the feedback resistance of the amplifier 7 is $(r_1+R_{ON})//r_2$, where $R_{ON}$ denotes the conducting resistance of the FETs 4 and 6, // denotes the parallel connection, and $r_1$ and $r_2$ denote the resistances of the resistors $R_1$ and $R_2$, respectively. Therefore, the gain of the amplifier 7 becomes minimum. Also, since the value of the inverting input resistance of the amlifier 8 is $(r_5+R_{ON})//r_6$, the gain of the amplifier 8 becomes maximum, where $r_5$ and $r_6$ denote the resistances of the resistors $R_5$ and $R_6$, respectively. In the following, it is assumed that the conducting resistance $R_{ON}$ of the FETs 4 and 6 is substantially zero under their stable on-condition, or stable period.

When the FETs 4 and 6 are in the intermediate active state between the on and off, that is, during the above-mentioned changeover period, the gains of the amplifiers 3 and 5 vary with the conducting resistance versus the gate voltage characteristics of the FETs 4 and 6.

In order to avoid the singing or howling, it is preferable that there is always a constant total gain which is defined by the product of the gains of the receiving and transmitting variable gain amplifiers 3 and 5. In the present embodiment, in the stable period during which the on- and off-states of the FETs 4 and 6 are stable, the gate voltages of the FETs 4 and 6 are constant, allowing the resistance values of the FETs 4 and 6 to be constant. Therefore, the total gain can readily be maintained to be constant.

However, in the changeover period during which the gains of the amplifier circuits 3 and 5 are changing over, that is, the FETs 4 and 6 are switching between on and off, the total gain may momentarily become larger than the total gain during the stable period, because the relative gate voltage versus resistance characteristics of the FETs 4 and 6 may be different. This means that the howling may occur during the changeover period. Therefore, it is necessary that the total gain during the changeover period be smaller than the total gain during the stable period. The manner of setting the total gain will be described hereinafter.

Now, it is assumed that both FETs 4 and 6 have the same resistance value $R_x$ for the same gate voltage. Then, the gains $G_R(R_x)$ and $G_T(R_x)$ of the receiving and transmitting variable gain amplifier circuits 3 and 5 are respectively given by, $$G_R(R_x) = \frac{\frac{(r_1 + R_x)\, r_2}{r_1 + r_2 + R_x}}{r_3} \tag{1}$$

and $$G_T(R_x) = \frac{r_4}{\frac{(r_5 + R_x)\, r_6}{r_5 + r_6 + R_x}} + 1 \tag{2}$$

Where: $r_3$ and $r_4$ denote the resistances of resistors $R_3$ and $R_4$, respectively.

It is further assumed that the changeover period of the gains of the variable gain amplifier circuits 3 and 5 are mutually equal.

Denoting the gains of the receiving and transmitting amplifier circuits 3 and 5 under the stable on-condition of the FET by $G_R(0)$ and $G_T(0)$, respectively, and the gains under the stable off-condition of the FET by $G_R(\infty)$ and $G_T(\infty)$, respectively, the necessary condition to make the total gain constant is written as, $$\frac{G_R(0)}{G_R(\infty)} = \frac{G_T(\infty)}{G_T(0)} \tag{3}$$

From equations (1), (2) and (3), the following relation can be obtained, $$\frac{r_4\, r_6}{r_4 + r_6} = \frac{r_2\, r_5}{r_1} \tag{4}$$

Here it is assumed that the resistance value of the FET under on-state is zero, while the resistance value under an off-state is infinite. As a result, the total gain, during the stable period is given by, $$G_R(\infty) \cdot G_T(\infty) = G_R(0) \cdot G_T(0) = \frac{r_2}{r_3} \cdot \frac{r_4 + r_6}{r_6} \tag{5}$$

On the other hand, the total gain during the changeover period is obtained from equations (1) and (2), $$G_R(R_x) \cdot G_T(R_x) = \frac{r_2}{r_3} \cdot \frac{r_4 + r_6}{r_6} \tag{6}$$

$$\left\{ 1 + \frac{r_4\, r_6}{(r_5 + R_x)(r_4 + r_6)} \right\} \frac{r_1 + R_x}{r_1 + r_2 + R_x}$$

In order to make the total gain constant irrespective of the changeover or stable period, the following relation should be held, $$G_R(R_x) \cdot G_T(R_x) = G_R(\infty) \cdot G_T(\infty) \tag{7}$$

Thus, by substituting equations (5) and (6) into (7), one obtains, $$\left\{ 1 + \frac{r_4\, r_6}{(r_5 + r_6)(r_4 + r_6)} \right\} \frac{r_1 + R_x}{r_1 + r_2 + R_x} = 1 \tag{8}$$

By substituting equation (4) into (8), the following relation can be obtained, $$\frac{1 + \frac{r_2\, r_5}{r_1(r_5 + R_x)}}{1 + \frac{r_2}{r_1 + R_x}} = 1 \tag{9}$$

which is rewritten to, $$\frac{r_2\, r_5}{r_1(r_5 + R_x)} = \frac{r_2}{r_1 + R_x} \tag{10}$$

From equation (10) one obtains, $$1 + \frac{R_x}{r_5} = 1 + \frac{R_x}{r_1} \tag{11}$$

which is rewritten to $$\frac{R_x}{r_5} = \frac{R_x}{r_1} \tag{12}$$

Consequently a final result is, $$r_1 = r_5 \tag{13}$$

However, the relation (13) can be held only under the assumption that the resistance value $R_x$ of all the FETs varies equally for the change of their gate voltages.

In other words, the relation (13) is not necessarily held during the changeover period. The total gain during the changeover period may become larger than the total gain during the stable period. Therefore, it is necessary to set the total gain during the changeover period to be smaller than the total gain during the stable period. Namely, the following setting is required, $$G_R(R_x)G_T(R_x) < G_R(\infty)G_T(\infty) \tag{14}$$

from which one obtains by using equations (4), (5), $$r_1 > r_5 \tag{15}$$

If the relation (15) is held, the total gain during the changeover period drops below a value which is less than the total gain during the stable period. The relation (15) means that the resistance of $r_5$ serially connected to the FET 6 is smaller than the resistance of $r_1$ serially connected to the FET 4. This can also be held in case the transmitting variable gain amplifier circuit 5 is an inverting amplifier.

Figure 3:
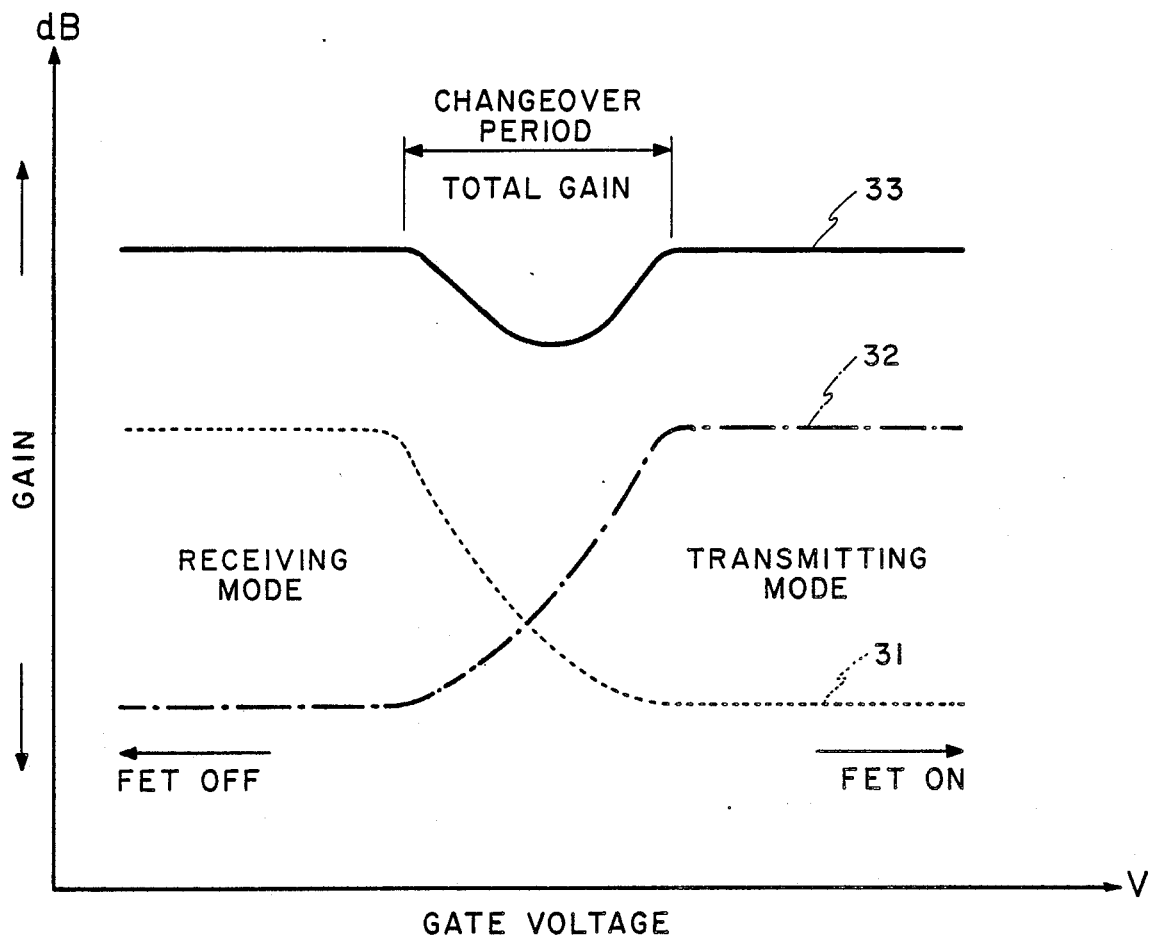
FIG. 3 is a graph showing the gate voltage versus gain characteristics of the embodiment shown in FIG. 1.

FIG. 3 shows a gate-voltage versus a gain characteristics of the FET. A broken line 31 denotes the gain of the amplifier 3, while a single-dotted broken line 32 and a solid line 33 denote the gain of the amplifier 5 and the total gain, respectively. As is obvious from FIG. 3, the total gain during the changeover period is smaller than the total gain during the stable period.

Figure 2:
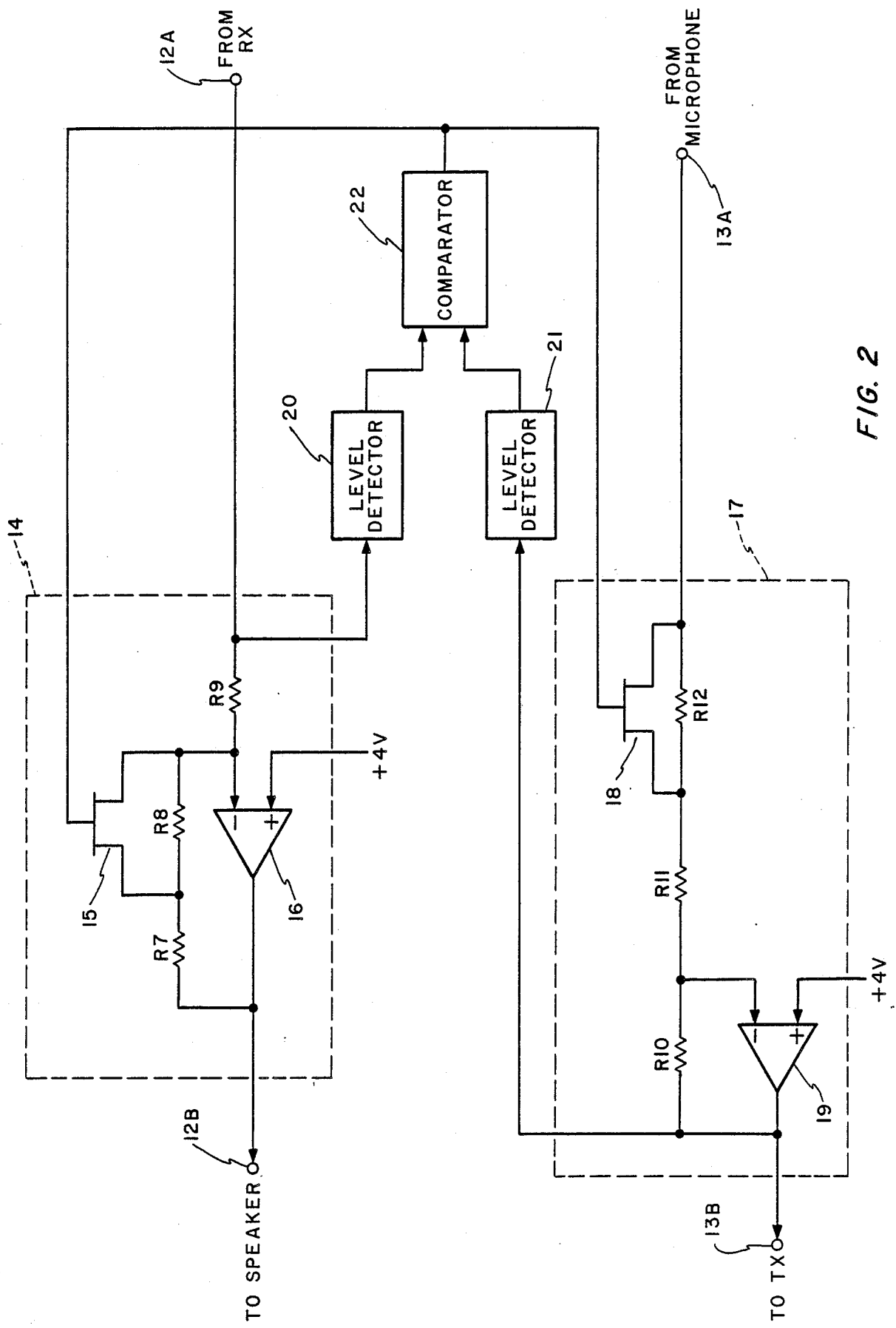
FIG. 2 is a schematic diagram showing a second embodiment of the loudspeaking telephone according to the present invention.

The second embodiment of the present invention will now be explained with reference to FIG. 2. In FIG. 2, the parallel connection of an FET 15 and a resistor $R_8$ is serially connected to a resistor $R_7$ of a operational amplifier 16 of a variable gain amplifier circuit 14 in the receiving path. An operational amplifier 19 of a variable-gain amplifier circuit 17 in the transmitting path is an inverting amplifier. The input resistor $R_{11}$ of the amplifier 19 is serially connected to the parallel connection of an FET 18 and a resistor $R_{12}$.

The gains $G_R(R_x)$ and $G_T(R_x)$ of the amplifiers 14 and 17 are given by, $$G_R(R_x) = \frac{r_7 + \frac{r_8 R_x}{r_8 + R_x}}{r_9} \tag{16}$$

and $$G_T(R_x) = \frac{r_{10}}{r_{11} + \frac{r_{12} R_x}{r_{12} + R_x}} \tag{17}$$

respectively, where $r_n$ (n=7 to 12) denotes the resistance of the Resister. When the FETs 15 and 18 are on, the equations (16) and (17) are reduced to, $$G_R(0) = \frac{r_7}{r_9} \tag{18}$$

and $$G_T(0) = \frac{r_{10}}{r_{11}} \tag{19}$$

respectively, while otherwise they are reduced to, $$G_R(\infty) = \frac{r_7 + r_8}{r_9} \tag{20}$$

and $$G_T(\infty) = \frac{r_{10}}{r_{11} + r_{12}} \tag{21}$$

respctively.

Since the changeover periods of the gains of the variable gain amplifier circuit 14 and 17 are mutually equal, and since the gains of the circuit 14 and 17 under the stable period should be equal, the following relation must be held, $$\frac{G_R(\infty)}{G_R(0)} = \frac{G_T(0)}{G_T(\infty)} \tag{22}$$

From equations (18) to (22), one obtains, $$\frac{r_8}{r_7} = \frac{r_{12}}{r_{11}} \tag{23}$$

Thus, the total gain during the stable period is, $$G_R(0) \cdot G_T(0) = \frac{r_7}{r_9} \cdot \frac{r_{10}}{r_{11}} \tag{24}$$

The total gain during the changeover period is obtained from equations (16) and (17), $$G_R(R_x) \cdot G_T(R_x) = \frac{r_7}{r_9} \cdot \frac{r_{10}}{r_{11}} \cdot \frac{1 + \frac{r_8}{r_7} \cdot \frac{1}{\frac{r_8}{R_x} + 1}}{1 + \frac{r_{12}}{r_{11}} \cdot \frac{1}{\frac{r_{12}}{R_x} + 1}} \tag{25}$$

As is similar to the first embodiment, the following relation should be held in order that the total gain during the changeover period is less than that during the stable period, $$G_R(R_x)G_T(R_x) < G_R(0)G_T(0). \tag{26}$$

If the equations (24) and (25) are substituted into equation (26), one obtains $$\frac{1 + \frac{r_8}{r_7} \cdot \frac{1}{\frac{r_8}{R_x} + 1}}{1 + \frac{r_{12}}{r_{11}} \cdot \frac{1}{\frac{r_{12}}{R_x} + 1}} < 1 \tag{27}$$

which is reduced to the final result using the relation (23), $$r_{12} < r_8 \tag{28}$$

Therefore, as is similar to the first embodiment, if the resistance $r_8$ of the resistor $R_8$ connected in parallel with the FET 15 of the variable gain amplifier circuit 14 in the receiving path is chosen to be larger than the resistance $r_{12}$ of the resistor $R_{12}$ connected in parallel with the FET 18 of the variable gain amplifier circuit 17 in the transmitting path, the total gain during the changeover period can be smaller than the total gain during the stable period.

As is explained above, the present invention utilizes the FET as a variable resistor so as to continuously and smoothly switch the gains of receiving and transmitting paths of the loudspeaking telephone. Moreover, by making the resistance of a resistor serially or parallelly connected to the FET in the receiving path larger than the resistance of a resistor serially or parallelly connected to the FET in the transmitting path, the total gain during the changeover period is made smaller than to gain during the stable state, so that the singing or howling can hardly occur.

What is claimed is:

1. A loudspeaking telephone with a variable gain circuit comprising:
    a receive path including first amplifying means for amplifying a receiving signal by a first gain to provide a received speech signal;
    a transmit path including second amplifying means for amplifying a transmitting speech signal by a second gain to provide a transmit signal;
    first means for comparing a signal level on said receive path with a signal level on said transmit path to provide a control signal to control said first and said second gains; and
    second means responsive to said control signal for switching between said first and second gains to make one of said gains larger than the other of said gains, said switching occurring during a discrete change over period;
    wherein the total gain obtained from said first and second gains during the changeover period of said gains is no greater than the total gain during the stable period excluding said changeover period.

2. A loudspeaking telephone as claimed in claim 1, wherein said first means comprises:
    first and second level detector means for detecting the levels of said receiving and transmitting signals, respctively; and
    level comparator means for comparing the output levels of said first and second level detector means with each other to provide the comparison result as said control signal.

3. A loudspeaking telephone as claimed in claim 2, wherein said level comparator means produces a first signal as said control signal when the output level of said first level detector means is larger than the output level of said second level detector means and produces a second signal as a control signal when the output level of said second level detector means is larger than the output level of said first level detector means; and
    wherein said second means controls, in response to said first signals, said first and second gains so that said first gain becomes larger than said second gain, and controls, in response to said second signal, said first and second gains so that said second gain becomes larger than said first gain.

4. A loudspeaking telephone claimed in claim 3, wherein said second means comprises means for maintaining said total gain during said stable period to be constant.

5. A loudspeaking telephone claimed in claim 3, wherein said second means comprises:
    first variable resistance means connected to a feedback resistor of said first amplifying means;
    second variable resistance means connected to a feedback resistor of said second amplifying means;
    first resistance means connected to said first variable resistance means; and
    second resistance means connected to said second variable resistance means and having a resistance which is smaller than the resistance of said first resistance means.

6. A loudspeaking telephone claimed in claim 5, wherein said first and second resistance means are serially connected to said first and second variable resistance means, respectively.

7. A loudspeaking telephone claimed in claim 5, wherein said first and second resistance means are connected in parallel with said first and second variable resistance means, respectively.

8. A loudspeaking telephone as claimed in claim 5, wherein said first and second variable resistance means comprises first and second FETs, respectively, said first and second FETs switching off when said first signal is applied to the gates thereof, and switching on when said second signal is applied to the gates thereof.

9. A loudspeaking telephone system comprising a transmit channel extending from a microphone through a first amplifier to a transmitter, a receive channel extending from a signal receiving means through a second amplifier to a speaker, first signal level detecting means for giving a first signal responsive to signal levels in said transmit channel, second signal level detecting means for giving a second signal responsive to signal levels in said receive channels, means responsive to said first and second signals for switching between said amplifiers to activate the amplifier in the channel having a signal with the higher signal level and deactivate the amplifier having a signal with the lower signal level, whereby there are change over periods during which both of said amplifiers are activated with a result that each of said amplifiers momentarily contributes gain to said system, and means effective during said change over period for limiting the total gain in said channels to no more than the total gain in either one of said channels when either one of said amplifiers is totally activated outside of said change over period.

10. The loudspeaker telephone of claim 9 wherein said first amplifier is an inverting amplifier and said second amplifier is a non-inverting amplifier.

11. The loudspeaking telephone of claim 9 and resistive means for controlling the gains of said amplifiers, and means effective during said change over period for altering said resistive means to control said total gain.

12. The loudspeaking telephone of claim 11 wherein said means for altering said resistive means comprises an FET coupled to selectively vary the resistance of a resistive element at the input of each of said amplifiers.

* * * * *